United States Patent Office 3,407,159
Patented Oct. 22, 1968

3,407,159
MIXTURE OF VINYL ESTER-VINYL PHOSPHONIC ACID ESTER COPOLYMERS AND NATURAL AND/OR SYNTHETIC RESINS AND ITS USE AS AN ADHESIVE
Walter Fink, Frankfurt am Main, and Heinz Lehmann, Kriftel, Taunus, Germany, assignors to Farbwerke Hoechst Aktiengesellschaft vormals Meister Lucius & Bruning, Frankfurt am Main, Germany, a corporation of Germany
No Drawing. Filed Oct. 24, 1966, Ser. No. 588,706
Claims priority, application Germany, Oct. 29, 1965, F 47,543
10 Claims. (Cl. 260—27)

ABSTRACT OF THE DISCLOSURE

Mixtures of (1) a copolymer formed between a vinyl ester and a di-ester of vinylphosphonic acid, with (2) certain natural and synthetic resins, and methods of adhering using these mixtures.

The present invention relates to mixtures of vinyl ester-vinylphosphonic acid ester-copolymers with natural and/or synthetic resins and to the use of such mixtures as an adhesive.

For bonding materials having a weak adhesion, such as for example plastics made of polyolefins, polyesters and polymers of fluorohydrocarbons, there can generally be only used adhesives that have a very high adhesiveness. Such adhesives, called pressure-sensitive adhesives, are already known in practice. They are mainly prepared from natural and synthetic rubber, polyvinyl alkyl ether and polyisobutylene or they contain combinations of these products with each other. These adhesives have the disadvantage of generally providing bonds showing a weakly yellow to yellow brown tint which is considerably intensified even after storage as short as 1 week at a temperature of 50° C.

The above-mentioned rubber adhesives can also not be used when they have to meet high requirements as to resistance to aging.

As pressure-sensitive adhesives are furthermore known in practice copolymers of vinyl acetate with various esters of unsaturated acids such as acrylic acid and maleic acid, and polymers formed by copolymerization of vinyl acetate and ethylene, which possess pressure-sensitive properties.

It has now been found that a mixture which is composed of 10 to 99%, preferably 70 to 90%, of a copolymer of at least one vinyl ester of a carboxylic acid and at least one vinylphosphonic acid di-ester, and 90 to 1%, preferably 30 to 10%, of at least one natural and/or synthetic resin which mixture may contain fillers and/or plasticizers, can be excellently used as a pressure-sensitive adhesive having very good adhesiveness, very good resistance to water and heat, and very good bond strength. The percentages mentioned refer to the total weight of the mixture of (a) the copolymer of a vinyl ester of a carboxylic acid and of a vinylphosphonic acid di-ester and (b) natural resin and/or synthetic resin.

The copolymer used according to the invention and composed of a vinyl ester of a carboxylic acid and a vinylphosphonic acid di-ester, contains, as the vinyl ester of a carboxylic acid, a vinyl ester of a monobasic carboxylic acid having from 1 to 19 carbon atoms, for example formic acid, propionic acid, valerianic acid, pelargonic acid, palmitic acid, stearic acid and benzoic acid. The copolymers mentioned above preferably contain vinylisobutyrate or versatic acid vinyl ester, i.e. the vinyl esters of a mixture of monobasic saturated branched aliphatic carboxylic acids having from 9 to 19 carbon atoms. Products containing vinyl acetate are particularly preferred.

As natural resins used according to the invention there may be mentioned rosin, rosin esters, for example of rosin and a saturated aliphatic alcohol containing from 1 to 6, preferably from 3 to 5, carbon atoms and from 1 to 6, preferably from 2 to 4, hydroxy groups, esters of partially or completely hydrogenated rosin and the alcohols mentioned, esters of hydroabietyl alcohol and polybasic organic acids, for example dihydroabietylphthalate, and copals. Synthetic resins used according to the invention are for example phenolic resins, terpenephenolic resins, melamine resins, maleinate resins, epoxide resins, ketone resins and cumarone-indene resins as such are mentioned, for example, in the publication by Irving Skeist, Handbook of Adhesives, Reinhold Publishing Corp., New York, 1962, and furthermore polymers such as are mentioned, for example, in the publication by Calvin E. Schildknecht "Vinyl and Related Polymers," New York, 1952. The natural and synthetic resins mentioned above can be added as such, or in the form of solutions or dispersions, to the copolymer of vinyl ester and vinylphosphonic acid di-ester.

The copolymer of vinyl ester and vinylphosphonic acid di-ester to be used is advantageously composed of 10 to 70% by weight of a di-ester of vinylphosphonic acid and a monovalent saturated aliphatic alcohol having from 4 to 20 carbon atoms, and 90 to 30% by weight of a vinyl ester of a carboxylic acid. There may also be used copolymers which, in addition to at least one vinyl ester and at least one vinylphosphonic acid di-ester, are also composed of another comonomer copolymerizable with vinyl esters or vinylphosphonic acid di-esters. As such comonomers there may be mentioned esters of acrylic or methacrylic acid or maleic acid and a monovalent aliphatic saturated alcohol having 2 to 8 carbon atoms. Generally, the amount of the last mentioned comonomer does not exceed 50%, calculated on the amount of vinyl ester and vinylphosphonic acid di-ester.

By carefully choosing the individual components, that is the copolymer of vinyl ester and vinylphosphonic acid di-ester as well as the natural/or synthetic resin, and by varying the mixing ratio, it is possible to exactly adapt the properties of the pressure-sensitive adhesive to each individual case. Soft adhesives having a high adhesive power or surface tack are mainly obtained by using copolymers of vinylacetate and vinylphosphonic acid di-ester or versatic acid vinyl ester and vinylphosphonic acid di-ester as well as soft resins. Relatively hard adhesives having a high bond strength predominantly result when copolymers of vinylisobutyrate and vinylphosphonic di-ester with an addition of hard resins are used. The copolymer of vinylisobutyrate and vinylphosphonic acid di-ester has the particular advantage of being easily soluble in gasoline. Thus, the copolymer can be extended with gasoline-soluble resins.

Mixtures which, in addition to the copolymer of vinyl ester and vinylphosphonic acid di-ester, contain from 1 to 10% of a synthetic resin comprising carbamic acid esters, for example a reaction product of butylurethane and formaldehyde, have a particularly favorable adhesiveness.

In addition, a relatively soft or flexible adhesive can be obtained by adding up to 20%, calculated on the total weight of the mixture of copolymer and natural and/or synthetic resin, of plasticizers, for example tricresyl phosphate, trichloroethyl phosphate, dibutylphthalate and/or vegetable oils such as linseed oil. It is also possible to add up to 40%, preferably up to 20%, referred to the weight of the mixture of copolymer and natural and/or synthetic resin, of fillers such as chalk, silicon dioxide or barite, without destroying the surface tack of the adhesive.

The mixtures used according to the invention may be applied as such, for example in a molten state, as so-called thermoplastic adhesives in the form of a solution, for example in esters such as ethyl acetate, hydrocarbons such as toluene, or in the form of a dispersion, for example an aqueous dispersion.

As is evident from the above disclosure, it is possible, because of the numerous possible combinations, to prepare pressure-sensitive adhesives with most different properties which can be adapted to each individual use.

The following examples serve to illustrate the invention, but they are not intended to limit it thereto, the parts being by weight unless otherwise stated.

EXAMPLE 1

20 parts of a 50% solution of a phthalate ester of hydroabietyl alcohol in toluene were mixed with 80 parts of a 50% solution of a copolymer of vinylacetate and vinylphosphonic acid di-ethylhexyl ester in a ratio of 50:50 in ethylacetate to yield an adhesive whose adhesion to a high-pressure polyethylene-, polypropylene-, polyterephthalic acid ester-, rigid and plasticized PVC-, superpolyamide-, cellulose triacetate- and cellulose film coated with polyvinylidene chloride was so high that a bond or a lamination could be made with glazed and bleached soda kraft paper (about 60 grams per m.$^2$). The adhesion was so high that by removing the film the paper was torn. The adhesive was highly resistant to aging. After the film-paper bond had been stored for 6 months at 50° C., no fatigue of the adhesion could be determined. By removing the film the paper was again torn. Furthermore, with the above mentioned mixtures, materials such as paper, cardboard, leather, textiles and fabrics could be so well bonded with different substrata, for example glass, ceramics, metal foils, plaster, concrete and wood, that these could only be removed from the substratum by tearing the material.

EXAMPLE 2

A mixture of 10 parts of a 50% solution of a cumaroneindene resin (softening point: 75° C.) in gasoline (100/140° C.) with 90 parts of a 50% solution of a vinylisobutyrate-vinylphosphonic acid diethyl ester copolymer (70:30) in gasoline served for bonding a cellulose triacetate film with paper. After an immersion in water for 4 weeks at room temperature, the adhesion was once more tested. The adhesive was well resistant to water and by removing the film the paper was torn.

EXAMPLE 3

A mixture of 20 parts of a 50% solution of polyvinyl acetate having a K-value of 30 in ethyl acetate and 80 parts of a 50% solution of a vinyl acetate-vinylphosphonic acid diethylhexyl ester copolymer (50:50) in ethyl acetate served for coating two strips of a polyterephthalic acid ester film, the adhesive having been applied with a thickness of 0.2 millimeter. After airing and conditioning at 65% of relative atmospheric moisture and 20° C., the adhesive sides of the two strips were bonded with each other and pressed together under a load of 1 kilogram per 5 cm. of film width. The resistance to splitting or peeling was measured at an advance rate of 100 millimeters per minute. With 420 grams per cm., it was twice as high as that of a bond with the copolymer of vinylacetate and vinylphosphonic acid diethylhexyl ester alone.

EXAMPLE 4

According to the method described in Example 3, two extended strips of polypropylene were coated with a mixture of 5 parts of a carbamic acid ester of butylurethane and formaldehyde with 95 parts of a 50% solution of a vinylacetate-vinylphosphonic acid di-ethylhexyl ester copolymer (50:50) in ethyl acetate and bonded with each other. The mixture had such a high adhesion to the polypropylene film that even by removing the film with a jerk it was not torn from the adhesive, but the separation took place within the adhesive layer whereas, in bonds with the copolymer alone, the film was split from the adhesive.

EXAMPLE 5

90 parts of a 53% aqueous dispersion of a coplymer of vinyl acetate and maleic acid dibutyl ester in a ratio of 70:30, the pH-value of which had been adjusted to 7 with ammonia of 25% strength, were mixed with 10 parts of a 50% solution of a copolymer of vinyl acetate and vinylphosphone-diethylhexyl-ester (50:50) in ethyl acetate. With this mixture, PVC-films, leather, felt, fabrics and linoleum were bonded with absorbing substrata such as paper, wood and plaster. By adding the copolymer of vinyl acetate and vinylphosphone-diethylhexyl ester, a relatively quick setting was achieved and the adhesion was increased.

EXAMPLE 6

A mixture of 25 parts of rosin (melting point: 84° C.) and 75 parts of a copolymer of vinyl acetate and vinylphosphonic acid di-ethylhexyl ester was melted and, with this melt, PVC- or aluminium-films were bonded with paper, cardboard and fabrics. The adhesion was so high that a splitting from the substrata resulted in torn material.

EXAMPLE 7

A mixture of 10 parts of a 50% solution of a terpene-phenolic resin (melting point: 55° C.) in gasoline (100/140° C.) with 90 parts of a 50% solution of a copolymer of versatic acid vinyl ester and vinylphosphonic acid diethylhexyl ester (70:30) in gasoline was applied to a strip of polyterephthalic acid ester film having a width of 5 cm., with a thickness of 0.3 millimeter. After the strip had been dried in a drying cabinet at 50° C. for 1 hour and bonded with an uncoated film strip, the resistance to splitting or peeling was determined at advance rate of 100 millimeters per minute. It was about twice as high as that of a bond with the copolymer without an addition of terpene-phenolic resin.

We claim:

1. A mixture comprising (1) 10 to 99 percent by weight of a copolymer of (a) a vinyl ester of a monobasic carboxylic acid having up to 19 carbon atoms and (b) a diester of vinyl phosphonic acid and a monohydroxylic saturated aliphatic alcohol having 4 to 20 carbon atoms, and (2) 90 to 1 percent by weight of a resin selected from the group consisting of rosin; an ester of hydroabietyl alcohol and a polybasic organic acid; a terpene-phenolic resin; a cumarone indene resin; polyvinyl acetate; a copolymer of vinyl acetate and maleic acid dibutyl ester; and a carbamic acid ester of the reaction product of butyl urethane and formaldehyde.

2. A mixture as in claim 1 wherein said vinyl ester (a) is vinyl isobutyrate.

3. A mixture as in claim 1 wherein said vinyl ester (a) is a mixture of vinyl esters of monobasic saturated branched aliphatic carboxylic acids having from 9 to 19 carbon atoms.

4. A mixture as in claim 1 wherein said vinyl ester (a) is vinyl acetate.

5. A mixture as in claim 1 comprising (1) 70 to 90 percent by weight of said copolymer and (2) 30 to 10 percent by weight of said resin.

6. The method of adhesively bonding two surfaces which comprises joining said surfaces at their interface with a mixture comprising (1) 10 to 99 percent by weight of a copolymer of (a) a vinyl ester of a monobasic carboxylic acid having up to 19 carbon atoms and (b) a diester of vinyl phosphonic acid and a monohydroxylic saturated aliphatic alcohol having 4 to 20 carbon atoms, and (2) 90 to 1 percent by weight of a resin selected from the group consisting of rosin; an ester of hydroabietyl alcohol and a polybasic organic acid; a terpene-phenolic resin; a cumarone-indene resin; polyvinyl acetate; a copolymer of vinyl acetate and maleic acid dibutyl ester; and a carbamic acid ester of the reaction product of butyl urethane and formaldehyde.

7. The method as in claim 6 wherein said vinyl ester (a) is vinyl isobutyrate.

8. The method as in claim 6 wherein said vinyl ester (a) is a mixture of vinyl esters of monobasic saturated branched aliphatic carboxylic acids having from 9 to 19 carbon atoms.

9. The method as in claim 6 wherein said vinyl ester (a) is vinyl acetate.

10. The method as in claim 6 wherein said mixture comprises (1) 70 to 90 percent by weight of said copolymer and (2) 30 to 10 percent by weight of said resin.

References Cited

UNITED STATES PATENTS

| 2,557,805 | 6/1951 | Upson | 260—80 |
| 2,732,367 | 1/1956 | Shokal | 260—836 |

FOREIGN PATENTS

| 1,274,011 | 9/1961 | France. |

OTHER REFERENCES

Schildknecht: "Vinyl and Related Polymers," J. Wiley & Sons, N.Y., 1952 TP 986 V 48 S 3 (p. 341 relied on).

DONALD E. CZAJA, *Primary Examiner.*

W. E. PARKER, *Assistant Examiner.*